US009400182B2

(12) United States Patent
Barcklay et al.

(10) Patent No.: US 9,400,182 B2
(45) Date of Patent: *Jul. 26, 2016

(54) PROBABILISTIC REVERSE GEOCODING

(71) Applicant: TeleCommunication Systems, Inc., Annapolis, MD (US)

(72) Inventors: Bob Barcklay, Berkely, CA (US); John Hahn, San Francisco, CA (US); Kevin Tsurutome, San Francisco, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,688

(22) Filed: Aug. 15, 2014

(65) Prior Publication Data

US 2015/0025798 A1 Jan. 22, 2015

Related U.S. Application Data

(63) Continuation of application No. 13/790,197, filed on Mar. 8, 2013, now Pat. No. 8,838,379, which is a continuation of application No. 12/588,143, filed on Oct. 6, 2009, now Pat. No. 8,396,658.

(60) Provisional application No. 61/136,805, filed on Oct. 6, 2008.

(51) Int. Cl.
*G01C 21/34* (2006.01)
*G01C 21/30* (2006.01)
(Continued)

(52) U.S. Cl.
CPC ............... *G01C 21/34* (2013.01); *G01C 21/20* (2013.01); *G01C 21/26* (2013.01); *G01C 21/30* (2013.01); *G01C 21/3415* (2013.01)

(58) Field of Classification Search
CPC ........ G01C 21/20; G01C 21/26; G01C 21/30; G01C 21/34; G01C 21/3415
USPC .................. 701/411, 412, 416, 417, 414, 491
See application file for complete search history.

(56) References Cited

U.S. PATENT DOCUMENTS

| 5,263,136 A | 11/1993 | DeAguiar |
|---|---|---|
| 5,359,529 A | 10/1994 | Snider |

(Continued)

FOREIGN PATENT DOCUMENTS

| CA | WO2006/125291 | 5/2005 |
|---|---|---|
| JP | 2008 039698 | 2/2008 |
| WO | WO2006/071271 | 7/2006 |

OTHER PUBLICATIONS

Ahern et al., "World Explorer: Visualizing Aggregate Data from Unstructured Text in Geo-Referened Collections," Jun. 18-23, 2007, ACM, JCDL'07.

(Continued)

*Primary Examiner* — Stanton L Krycinski
(74) *Attorney, Agent, or Firm* — Tarolli, Sundheim, Covell & Tummino LLP

(57) ABSTRACT

The accuracy of a reverse geocode for a GPS fix in a mobile phone navigation device is improved significantly by considering together the user's last known location on an original route, the elapsed time between the last known location on the original route and the latest GPS fix, and the likelihood that the user could have traveled from the last known location on the original route to one of numerous candidate locations (generated from the reverse geocode) in the elapsed time. The navigation server relies only on a GPS fix, timestamps, and a back-end routing database to provide improved or superior accuracy of reverse geocoding a GPS fix (selection of a point on a road) when a relevant user has deviated from the intended route. The reverse geocoding allows for accurate and functional re-routing capabilities.

5 Claims, 10 Drawing Sheets

(51) Int. Cl.
  *G01C 21/20* (2006.01)
  *G01C 21/26* (2006.01)

(56) References Cited

U.S. PATENT DOCUMENTS

| | | |
|---|---|---|
| 5,781,200 A | 7/1998 | Lu |
| 5,832,408 A | 11/1998 | Tamai |
| 5,973,700 A | 10/1999 | Taylor |
| 6,026,398 A | 2/2000 | Brown |
| 6,064,941 A | 5/2000 | Nimura |
| 6,104,416 A | 8/2000 | McGuiness |
| 6,108,650 A | 8/2000 | Musk |
| 6,119,013 A | 9/2000 | Maloney |
| 6,144,338 A | 11/2000 | Davies |
| 6,262,741 B1 | 7/2001 | Davies |
| 6,317,686 B1 | 11/2001 | Ran |
| 6,377,810 B1 | 4/2002 | Geiger |
| 6,377,945 B1 | 4/2002 | Risvik |
| 6,401,034 B1 | 6/2002 | Kaplan |
| 6,424,912 B1 | 7/2002 | Correia |
| 6,434,482 B1 | 8/2002 | Oshida |
| 6,470,189 B1 | 10/2002 | Hill |
| 6,480,783 B1 | 11/2002 | Myr |
| 6,487,495 B1 | 11/2002 | Gale |
| 6,507,785 B1 | 1/2003 | Stefan |
| 6,529,143 B2 | 3/2003 | Mikkola |
| 6,571,169 B2 | 5/2003 | Miyaki |
| 6,587,782 B1 | 7/2003 | Nocek |
| 6,628,938 B1 | 9/2003 | Rachabathuni |
| 6,636,803 B1 | 10/2003 | Hartz |
| 6,671,424 B1 | 12/2003 | Skoll |
| 6,714,205 B1 | 3/2004 | Miyahita |
| 6,734,867 B1 | 5/2004 | Munshi |
| 6,820,092 B2 | 11/2004 | Nakano |
| 6,862,524 B1 | 3/2005 | Nagda |
| 6,940,407 B2 | 9/2005 | Miramda-Knapp |
| 6,954,697 B1 | 10/2005 | Smith |
| 6,963,748 B2 | 11/2005 | Chithambaram |
| 6,976,253 B1 | 12/2005 | Wierman et al. |
| 7,054,743 B1 | 5/2006 | Smith |
| 7,093,286 B1 | 8/2006 | King |
| 7,155,339 B2 | 12/2006 | Tu |
| 7,190,839 B1 | 3/2007 | Feather |
| 7,373,246 B2 | 5/2008 | O'Clair |
| 7,379,729 B2 | 5/2008 | Holland |
| 7,385,600 B2 | 6/2008 | Marion |
| 7,444,326 B1 | 10/2008 | Jagadish |
| 7,480,566 B2 | 1/2009 | Laverty |
| 7,546,202 B2 | 6/2009 | Oh |
| 7,565,239 B2 | 7/2009 | De Silva et al. |
| 7,627,656 B1 | 12/2009 | Anand et al. |
| 7,706,977 B2 | 4/2010 | Soehren |
| 7,853,403 B2 | 12/2010 | Tanaka |
| 7,873,370 B2 | 1/2011 | Shim |
| 7,949,642 B2 | 5/2011 | Yang |
| RE42,927 E | 11/2011 | Want |
| 8,095,434 B1 | 1/2012 | Puttick |
| 8,265,864 B1 | 9/2012 | Kaufman |
| 8,296,062 B2 | 10/2012 | Yamane |
| 2001/0021894 A1 | 9/2001 | Sakamoto |
| 2001/0038626 A1 | 11/2001 | Dynarski |
| 2001/0047241 A1 | 11/2001 | Khavakh |
| 2002/0021231 A1 | 2/2002 | Schlager |
| 2002/0037716 A1 | 3/2002 | McKenna |
| 2002/0042819 A1 | 4/2002 | Reichert |
| 2002/0067353 A1 | 6/2002 | Kenyon |
| 2002/0082774 A1 | 6/2002 | Bloebaum |
| 2002/0083062 A1 | 6/2002 | Neal |
| 2002/0098851 A1 | 7/2002 | Walczak |
| 2002/0130953 A1 | 9/2002 | Riconda |
| 2002/0190861 A1 | 12/2002 | Wentworth |
| 2002/0198694 A1 | 12/2002 | Yang |
| 2003/0011623 A1 | 1/2003 | Dermer |
| 2003/0033083 A1 | 2/2003 | Nakashima |
| 2003/0034936 A1 | 2/2003 | Ernst |
| 2003/0055555 A1 | 3/2003 | Knockeart |
| 2003/0071728 A1 | 4/2003 | McDonald |
| 2003/0095525 A1 | 5/2003 | Lavin |
| 2003/0128211 A1 | 7/2003 | Watanabe |
| 2003/0182052 A1 | 9/2003 | DeLorme |
| 2004/0003125 A1 | 1/2004 | Ichimura |
| 2004/0023645 A1 | 2/2004 | Olsen |
| 2004/0027258 A1 | 2/2004 | Pechatnikov |
| 2004/0030493 A1 | 2/2004 | Pechatnikov |
| 2004/0067773 A1 | 4/2004 | Rachabathuni |
| 2004/0135784 A1 | 7/2004 | Cohen |
| 2004/0158829 A1 | 8/2004 | Beresin |
| 2004/0185870 A1 | 9/2004 | Matsuda |
| 2004/0203603 A1 | 10/2004 | Pierce |
| 2004/0203873 A1 | 10/2004 | Gray |
| 2004/0215641 A1 | 10/2004 | Kothuri |
| 2004/0217980 A1 | 11/2004 | Radburn |
| 2004/0220918 A1 | 11/2004 | Scriffignano |
| 2004/0224702 A1 | 11/2004 | Chaskar |
| 2004/0225437 A1 | 11/2004 | Endo |
| 2004/0249568 A1 | 12/2004 | Endo |
| 2005/0148342 A1 | 7/2005 | Sylvain |
| 2005/0149253 A1 | 7/2005 | Nambata |
| 2005/0188333 A1 | 8/2005 | Hunleth |
| 2005/0228780 A1 | 10/2005 | Diab |
| 2005/0245249 A1 | 11/2005 | Wierman et al. |
| 2005/0251331 A1 | 11/2005 | Kreft |
| 2005/0270311 A1 | 12/2005 | Rasmussen |
| 2005/0288033 A1 | 12/2005 | McNew |
| 2006/0005114 A1 | 1/2006 | Williamson |
| 2006/0015513 A1 | 1/2006 | Poyhonen et al. |
| 2006/0023626 A1 | 2/2006 | Krausz |
| 2006/0055693 A1 | 3/2006 | Sylthe |
| 2006/0064235 A1 | 3/2006 | Ishikawa |
| 2006/0089788 A1 | 4/2006 | Laverty |
| 2006/0089792 A1 | 4/2006 | Manber |
| 2006/0105782 A1 | 5/2006 | Brock |
| 2006/0116818 A1 | 6/2006 | Chao et al. |
| 2006/0135178 A1 | 6/2006 | Allyn |
| 2006/0155679 A1 | 7/2006 | Kothuri |
| 2006/0167616 A1 | 7/2006 | Yamane |
| 2006/0174209 A1 | 8/2006 | Barros |
| 2006/0200304 A1 | 9/2006 | Oh |
| 2006/0200308 A1 | 9/2006 | Arutunian |
| 2006/0206586 A1 | 9/2006 | Ling |
| 2006/0223518 A1 | 10/2006 | Haney |
| 2006/0229802 A1 | 10/2006 | Vertelney |
| 2006/0246922 A1 | 11/2006 | Gasbarro |
| 2006/0251008 A1 | 11/2006 | Wu |
| 2006/0253247 A1 | 11/2006 | De Silva et al. |
| 2007/0015518 A1 | 1/2007 | Winter |
| 2007/0036318 A1 | 2/2007 | Gits et al. |
| 2007/0072620 A1 | 3/2007 | Levitan |
| 2007/0083557 A1 | 4/2007 | Leiserowitz |
| 2007/0083649 A1 | 4/2007 | Zuzga |
| 2007/0105554 A1 | 5/2007 | Clark |
| 2007/0118520 A1 | 5/2007 | Bliss |
| 2007/0124216 A1 | 5/2007 | Lucas |
| 2007/0153983 A1 | 7/2007 | Bloebaum |
| 2007/0155401 A1 | 7/2007 | Ward |
| 2007/0156334 A1 | 7/2007 | Vu |
| 2007/0174259 A1 | 7/2007 | Amjadi |
| 2007/0213043 A1 | 9/2007 | Son |
| 2007/0219706 A1 | 9/2007 | Sheynblat |
| 2007/0219708 A1 | 9/2007 | Brasche |
| 2007/0233817 A1 | 10/2007 | Johnson |
| 2007/0238472 A1 | 10/2007 | Wanless |
| 2007/0239752 A1 | 10/2007 | Beitman |
| 2007/0253642 A1 | 11/2007 | Berrill |
| 2007/0281690 A1 | 12/2007 | Altman |
| 2007/0281707 A1 | 12/2007 | Thomson |
| 2007/0288613 A1 | 12/2007 | Sudame et al. |
| 2007/0298812 A1 | 12/2007 | Singh |
| 2008/0004043 A1 | 1/2008 | Wilson |
| 2008/0071465 A1 | 3/2008 | Chapman |
| 2008/0082262 A1 | 4/2008 | Silva et al. |
| 2008/0104227 A1 | 5/2008 | Birnie |
| 2008/0112372 A1 | 5/2008 | Thomson |
| 2008/0112551 A1 | 5/2008 | Forbes et al. |

(56) References Cited

U.S. PATENT DOCUMENTS

| | | |
|---|---|---|
| 2008/0113671 A1 | 5/2008 | Ghozati |
| 2008/0130597 A1 | 6/2008 | Kalhan |
| 2008/0139114 A1 | 6/2008 | Ranganathan |
| 2008/0140307 A1 | 6/2008 | Chen |
| 2008/0146207 A1 | 6/2008 | Razdan |
| 2008/0153550 A1 | 6/2008 | Otaka |
| 2008/0171559 A1 | 7/2008 | Frank |
| 2008/0177839 A1 | 7/2008 | Chang |
| 2008/0218407 A1 | 9/2008 | Norda |
| 2008/0227463 A1 | 9/2008 | Hizume |
| 2008/0249983 A1 | 10/2008 | Meisels |
| 2008/0261560 A1 | 10/2008 | Ruckart |
| 2008/0268822 A1 | 10/2008 | Johnson |
| 2008/0270366 A1 | 10/2008 | Frank |
| 2008/0275637 A1 | 11/2008 | Kim |
| 2008/0280599 A1 | 11/2008 | Cheng |
| 2008/0307445 A1 | 12/2008 | Garg |
| 2008/0319652 A1 | 12/2008 | Moshfeghi |
| 2008/0319653 A1 | 12/2008 | Moshfeghi |
| 2008/0319990 A1 | 12/2008 | Taranenko |
| 2009/0009397 A1 | 1/2009 | Taylor |
| 2009/0018840 A1 | 1/2009 | Lutz |
| 2009/0029693 A1 | 1/2009 | Liwell |
| 2009/0055087 A1 | 2/2009 | Beacher |
| 2009/0061852 A1 | 3/2009 | Feher |
| 2009/0061862 A1 | 3/2009 | Alberth |
| 2009/0144247 A1 | 6/2009 | Wistrand et al. |
| 2009/0150349 A1 | 6/2009 | Cartin |
| 2009/0171955 A1 | 7/2009 | Merz |
| 2009/0192702 A1 | 7/2009 | Bourne |
| 2009/0237307 A1 | 9/2009 | Tsai |
| 2009/0298505 A1 | 12/2009 | Drane |
| 2009/0325615 A1 | 12/2009 | Mckay |
| 2010/0037057 A1 | 2/2010 | Shim et al. |
| 2010/0094550 A1 | 4/2010 | Tsurutome et al. |
| 2011/0003578 A1 | 1/2011 | Chen et al. |
| 2011/0035141 A1 | 2/2011 | Barker |

OTHER PUBLICATIONS

International Search Report in PCT/US2009/05486 dated Jan. 21, 2010.

International Search Report in PCT/US2008/10543 dated Aug. 19, 2010.

International Search Report in PCT/US2008/10542 dated Aug. 19, 2010.

European Search Report received in European Appl. No. 09819546.4 dated Oct. 15, 2012.

John Krumm et al, "Map Matching with Travel Time Constraints", SAE 2007 World Congress, Apr. 19, 2007.

U.S. Appl. No. 1/251,766, filed Oct. 2005, Barcklay.

PROBABILISTIC REVERSE GEOCODING

This application is a continuation of U.S. application Ser. No. 13/790,197, entitled "Probalistic Reverse Geocoding", filed Mar. 8, 2013; which claims is a continuation of U.S. application Ser. No. 12/588,143, entitled "Probalistic Reverse Geocoding," filed on Oct. 6, 2009, now U.S. Pat. No. 8,396,658; which claims priority from U.S. Provisional Application No. 61/136,805, entitled "Probabilistic Reverse Geocoding" to Barcklay, filed Oct. 6, 2008, the entirety of all three are explicitly incorporated herein by reference.

BACKGROUND OF THE INVENTION

1. Field of the Invention

This invention relates generally to wireless communication. More particularly it relates to route guidance (navigation) on a mobile wireless device including global positioning satellite (GPS) capability.

2. Background of Related Art

Navigation devices are typically GPS-based electronic systems used in a vehicle to provide a real-time map of the vehicle's current location, together with step-by-step directions to a requested destination.

All navigation devices must handle the condition in which the user deviates (leaves) their intended route. When this condition occurs, the application typically determines the user's current location by "reverse geocoding" the last GPS fix from the device. This new current location is then used to generate a new route to the original destination.

Reverse geocoding is a process of returning an estimated position on a street as it relates to a given latitude/longitude coordinate. Mobile applications available today use a simple reverse geocoding algorithm to locate the closest point on any road segment near the GPS coordinate received from the device.

However, due to the inherent inaccuracy of a GPS fix, this simplistic approach may locate the user on an incorrect road that is near the user's true location. Since this occurs while the user is driving and after they have deviated from the intended route, the cost of an incorrect reverse geocode is quite high since the new route will also be incorrect.

SUMMARY OF THE INVENTION

In accordance with the principles of the present invention, a method of providing an accurate location to a portable navigation device in a congested area when in an off-route condition comprises obtaining a latest location fix of the user's wireless navigation device, the latest location fix being off-route. A last known on-route location of a user's wireless navigation device is obtained. An elapsed time between the last known on-route location and the latest location fix is determined. A reverse geocode is performed on the latest location fix resulting in a plurality of potential location candidates. An estimated time of travel from the last known on-route location to each of the potential location candidates is determined, and a current location of the user's wireless navigation device is mapped as the potential location candidate having a travel time closest to the elapsed time.

A method of providing navigation server-based support for a wireless navigation device in accordance with another aspect of the invention comprises considering together a user wireless device's last known on-route location, a latest GPS fix of the user's wireless device, and an elapsed time between the last known location on the original route and the latest GPS fix. A likelihood that the user's wireless device could have traveled from the last known on-route location on the original route to one of a plurality of candidate locations generated from a reverse geocode, in the elapsed time, is determined. An estimated time of travel from the last known on-route location to each of the plurality of candidate locations is determined, and mapping information is provided based on a current location of the user's wireless navigation device being determined as being the potential location candidate that has an estimated time of travel closest to the elapsed time.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Car navigation systems typically employ superior GPS technology, gyros and actual vehicle speed to determine a vehicle's current position more accurately. But more recently navigation applications have become available on wireless phones. However, mobile phones don't have access to a directly measured speed of a vehicle as do installed car navigation systems. Moreover, the antenna of a mobile phone may not be in an ideal position as are the antennas for an installed car navigation system. While very good, inaccuracies in the measurement of a current location may lead to an erroneous mapping onto a road in a mobile phone navigation application, particularly in areas where many roads intersect. In a worse case, such inaccuracies can result in mapping of a vehicle on a wrong road.

The present inventors have discovered that the accuracy of a reverse geocode can be improved significantly by considering together the user's last known location on the original route, the elapsed time between the last known location on the original route and the latest GPS fix, and the likelihood that the user could have traveled from the last known location on the original route to one of numerous candidate locations (generated from the reverse geocode) in the elapsed time.

The present invention provides an alternative approach to reverse geocoding that relies only on a GPS fix, timestamps, and a back-end routing database. The present invention provides improved or superior accuracy of reverse geocoding a GPS fix (selection of a point on a road) when a relevant user has deviated from the intended route. The reverse geocoding allows for accurate and functional re-routing capabilities.

Figure 1:
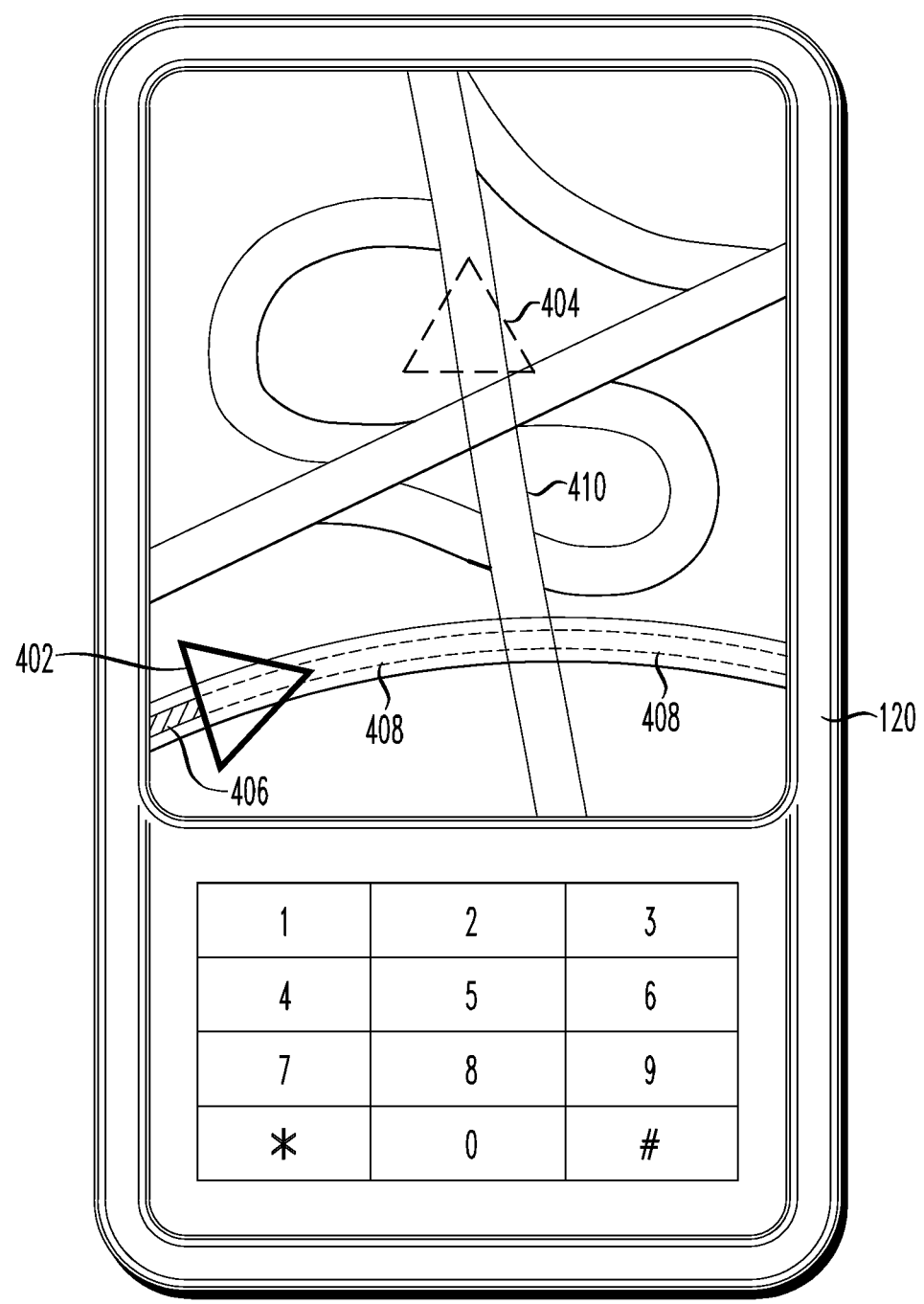
FIG. 1 shows an exemplary mobile phone including a user interface providing route guidance navigation, as a user goes off route, in accordance with the principles of the present invention.

FIG. 1 shows an exemplary mobile phone including a user interface providing visual route guidance navigation, as a user goes off route, in accordance with the principles of the present invention.

In particular, FIG. 1 depicts a mobile phone 120 providing visual route guidance navigation to a user via a visual user interface including a mobile phone display. In the disclosed embodiments, the user is presumed to be in an automobile, though the present invention relates equally to travel by way of any vehicle, including bicycles, bus, as well as travel by foot.

Though shown and described with respect to a visual user interface to guide a user of a mobile phone 120, the present invention relates equally to audio route guidance and/or visual route guidance.

On the display of the mobile phone 120, a visual user interface displays a map with relevant paths (e.g., roads in the case of vehicle travel). In the described situation, the user of the mobile phone 120 is carrying it with them while traveling in a car or bus as they approach an area congested with roadways. The invention has particular applicability to points at which one road passes over another, where a navigation application can easily get confused. In the given situation the user is traveling in a vehicle in an area near to quite a few roadways.

The triangular icon 402 depicts the vehicle in which the user is traveling, at its last known position of the mobile phone 120 as it traveled along a route 406. In the shown example, the user was presented with, and was expected to travel along, a previously calculated route 408. However, in the given scenario, the latest GPS fix puts the user at a point that would otherwise be considered to be along a different roadway. The triangular icon 404 depicts the latest GPS position fix of a user as reported by the GPS device of the mobile phone 120 carried by a passenger of a vehicle that was previously traveling along a preplanned route 408.

Figure 2:
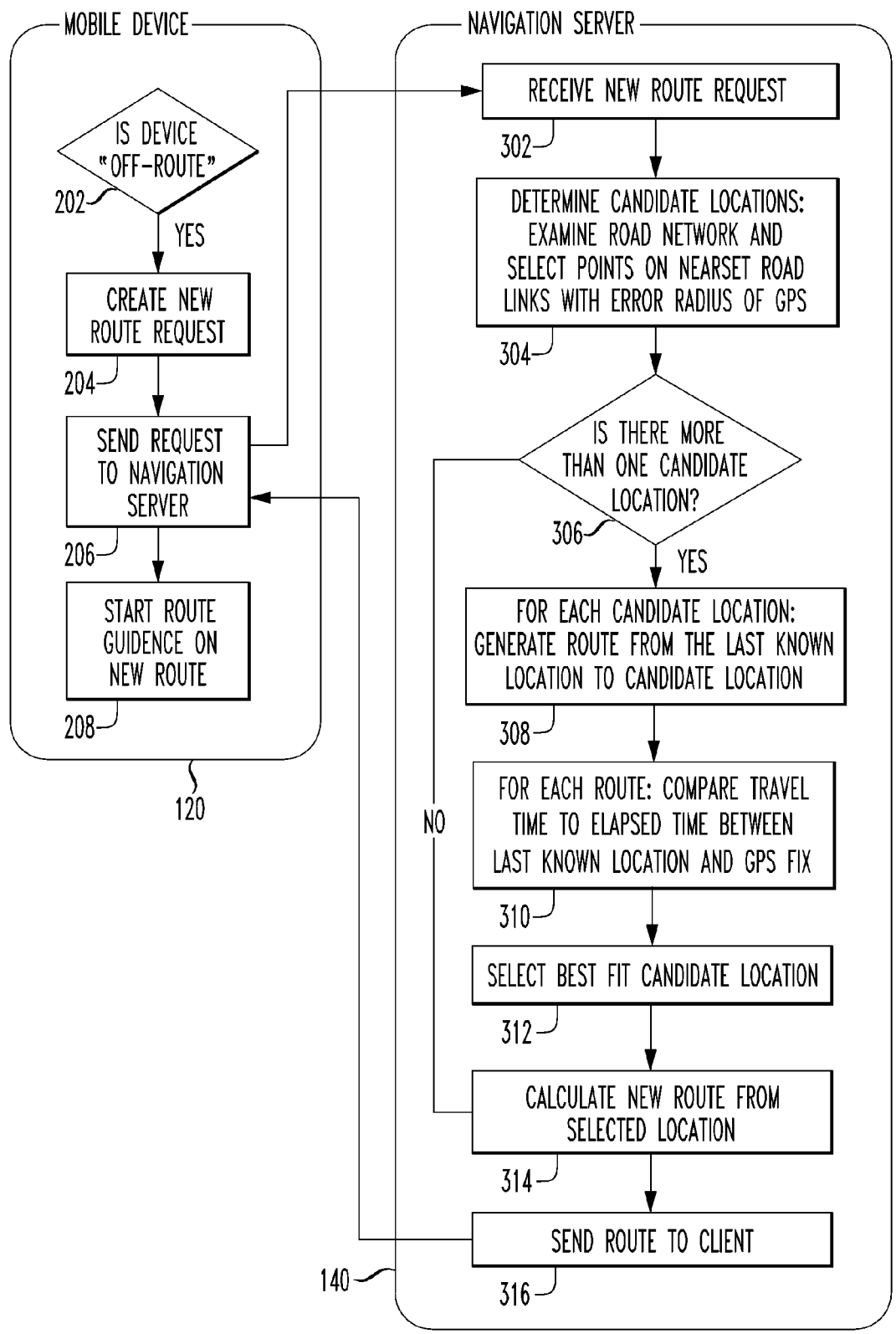
FIG. 2 shows an exemplary method providing probabilistic reverse geocoding for a user of a mobile phone with an operating route guidance navigation interface, in accordance with the principles of the present invention.

FIG. 2 shows an exemplary method providing probabilistic reverse geocoding for a user of a mobile phone with an operating route guidance navigation interface, in accordance with the principles of the present invention.

In particular, as shown in FIG. 2, a mobile device 120 performs a navigation method supported by route guidance navigation information provided by a remote navigation server 140 within a phone network. The mobile device 120 communicates with the remote navigation server 140 via an otherwise conventional wireless phone protocol.

The method for probabilistic geocoding in accordance with the principles of the present invention begin with the following preferable input:

(a) Last known location on a road segment (map matched by the application) (While the user travels along a route, the application 'map matches' each GPS fix to the nearest point on the route. When the distance to the nearest point exceeds some threshold, the user is considered off route.

(b) Timestamp of last known location.

(c) Current GPS fix (lat/lon) from the device.

(d) Timestamp of current GPS fix.

An exemplary method for probabilistic geocoding in accordance with the principles of the present invention is as follows:

In the mobile device 120, steps 202-208 are performed in the exemplary embodiment, whereas steps 302-316 are performed at a suitable navigation server 140 in the exemplary embodiment.

In step 202 of the mobile device 120, the mobile phone 120 determines or otherwise obtains information informing it that it is 'off-route'.

In step 204, a new route request is created.

In step 206, the new route request is sent to the navigation server 140.

In step 208, after the navigation server 140 provides a new route back to the mobile phone 120, guidance is started on the new route received back from the navigation server 140.

The navigation server 140 receives a new route request from the mobile phone 120 in step 302.

In step 304, the navigation server 140 determines candidate locations. The navigation server 140 also examines the road network proximate to the latest GPS fix position. The navigation server 140 also selects points on nearest road links within a given error radius of the GPS fix.

In step 306, the navigation server 140 determines if there are more than one candidate location, or road presence point, within a given error radius of the latest GPS fix. A list of candidate reverse geocode location results is generated from the current GPS fix 404. Each candidate location is a point on a road segment near the actual latitude/longitude.

Figure 3:
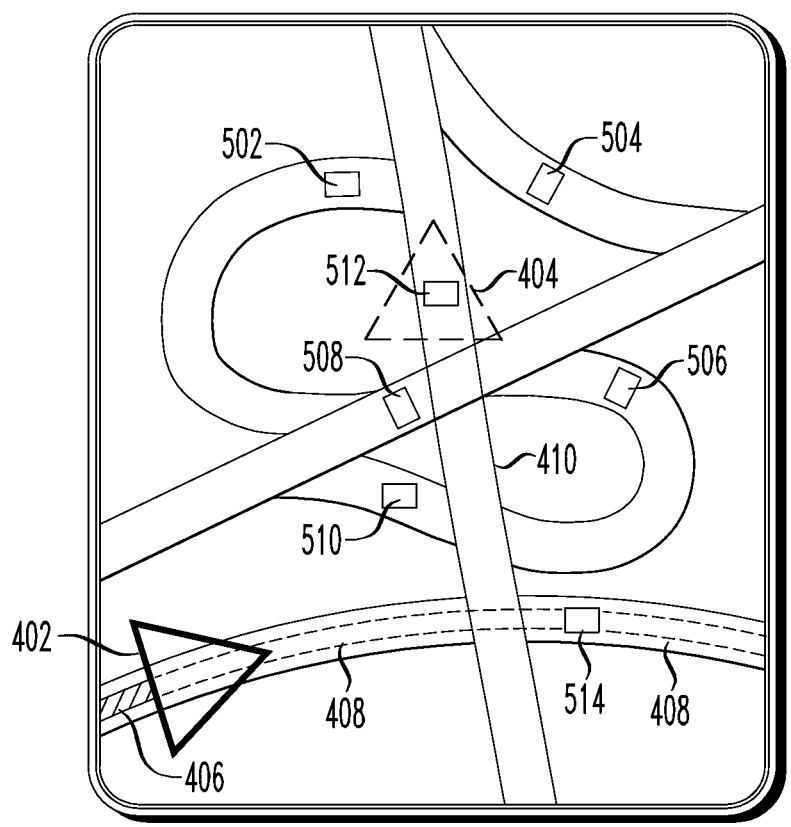
FIG. 3 shows a graphical depiction of a list of candidate reverse geocodes generated by a current GPS fix, each being a point on a road segment near the actual latitude/longitude, in accordance with the principles of the present invention.

FIG. 3 shows a graphical depiction of a list of candidate reverse geocodes generated by a current GPS fix, each being a point on a road segment near the actual latitude/longitude, in accordance with the principles of the present invention.

In particular, as shown in FIG. 3; a latest GPS fix is depicted by the triangular icon 404. However, in the given example, at least 6 candidate locations 502-512 are identified by the navigation server 140.

Referring back to FIG. 2, in step 308, for each candidate location, a route is generated for each candidate location, from the last known location 406, to the respective candidate location.

FIGS. 4A to 4G show a route generated between the last known location and each respective candidate reverse geocode result shown in FIG. 3.

Figure 4A:
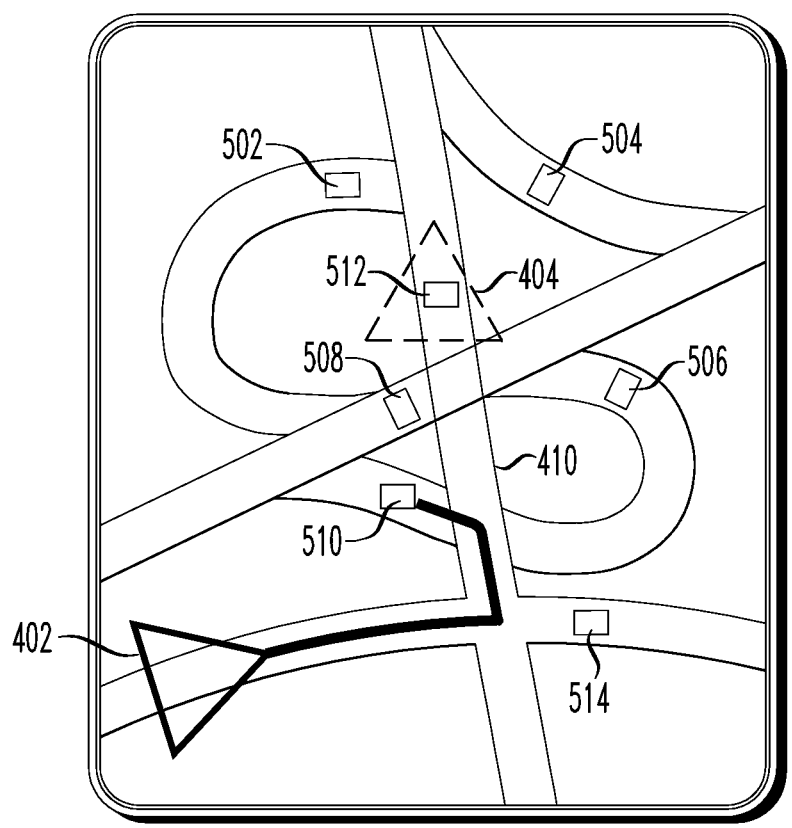
FIGS. 4A to 4G show a route generated between the last known location and each respective candidate reverse geocode result shown in FIG. 3.
Figure 4B:
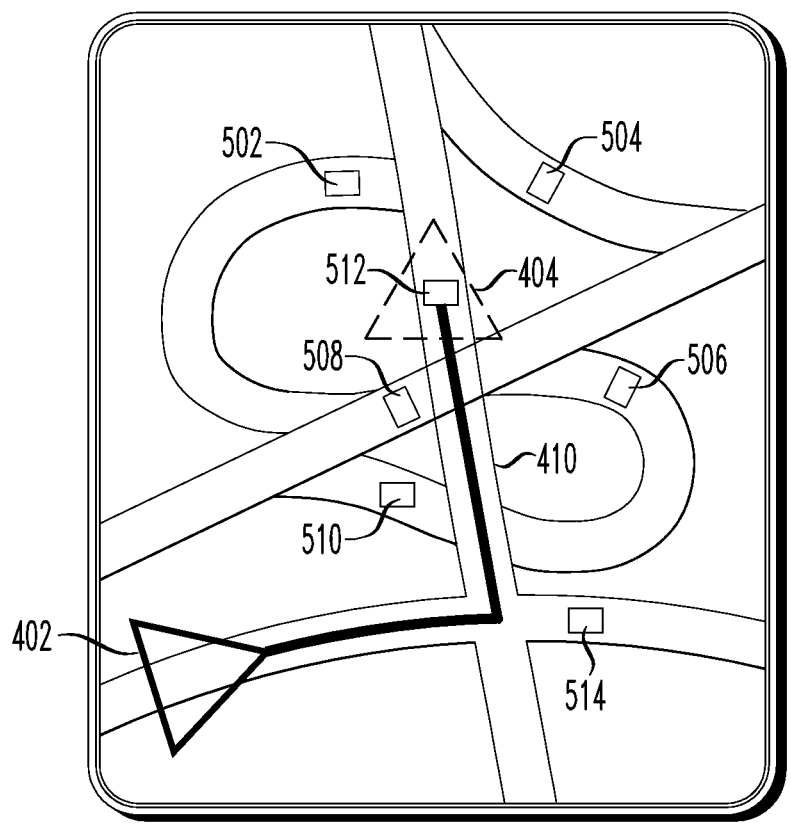
Figure 4C:
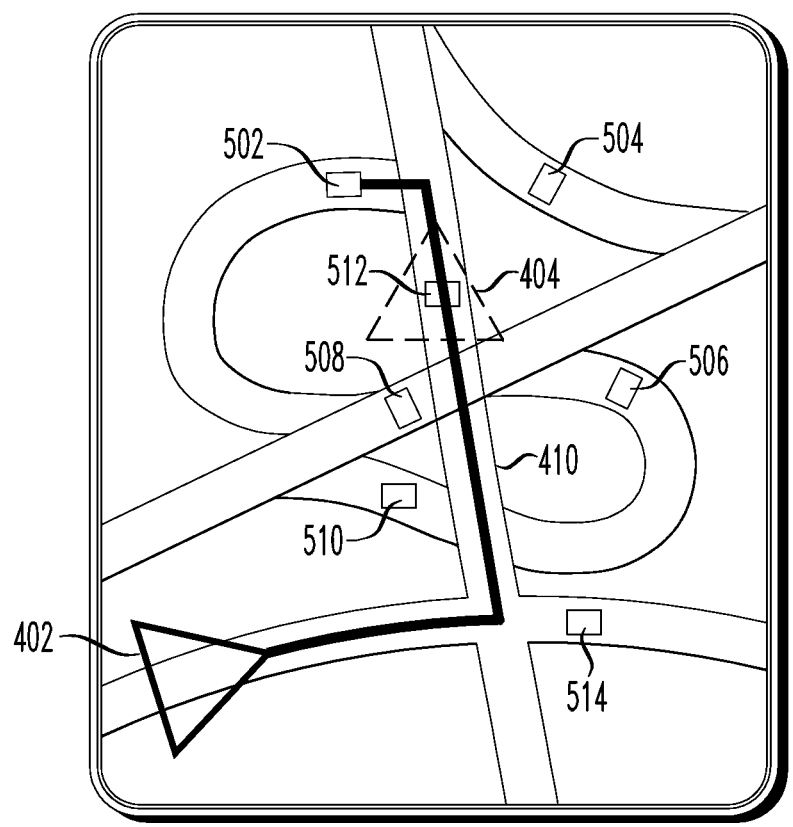
Figure 4D:
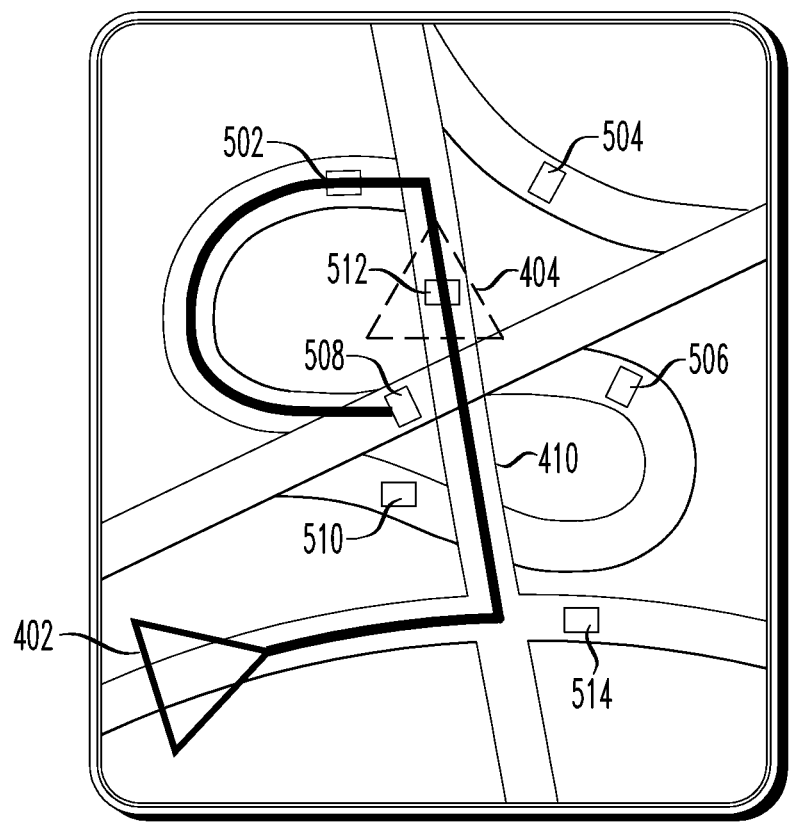
Figure 4E:
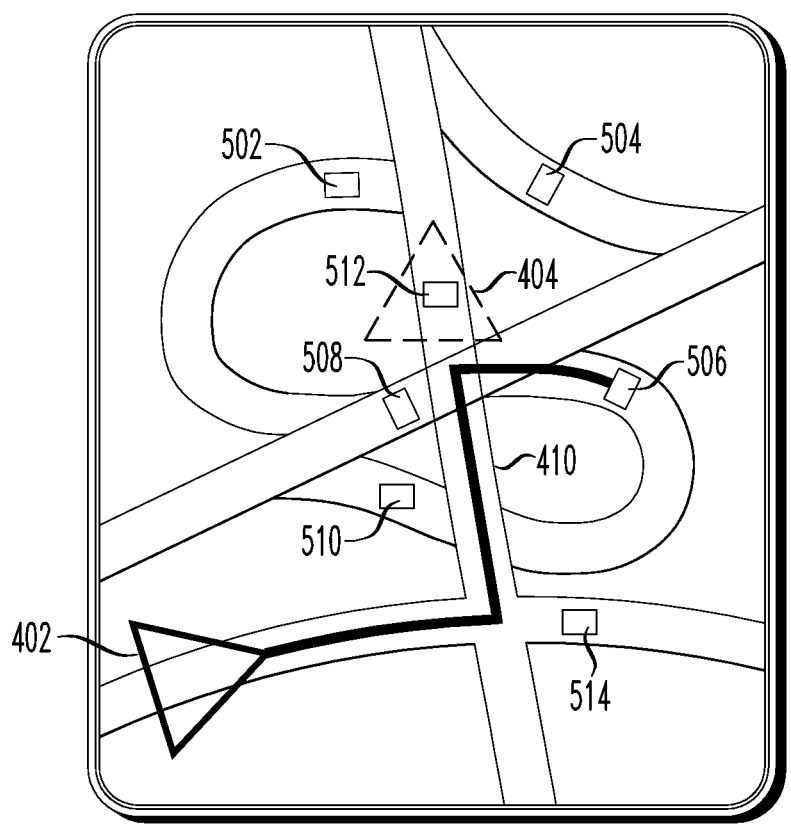
Figure 4F:
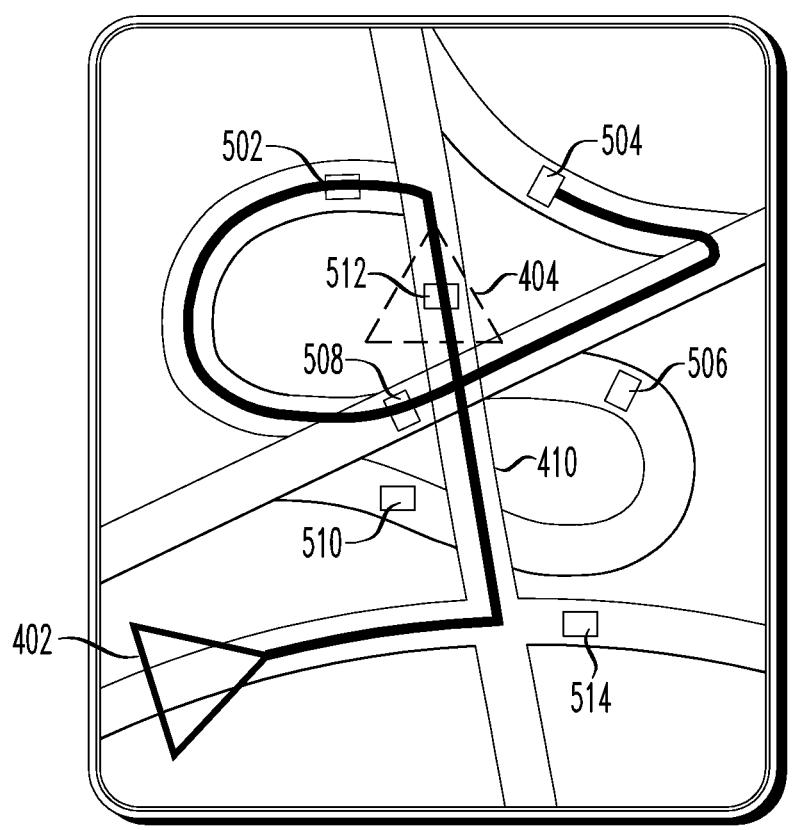
Figure 4G:
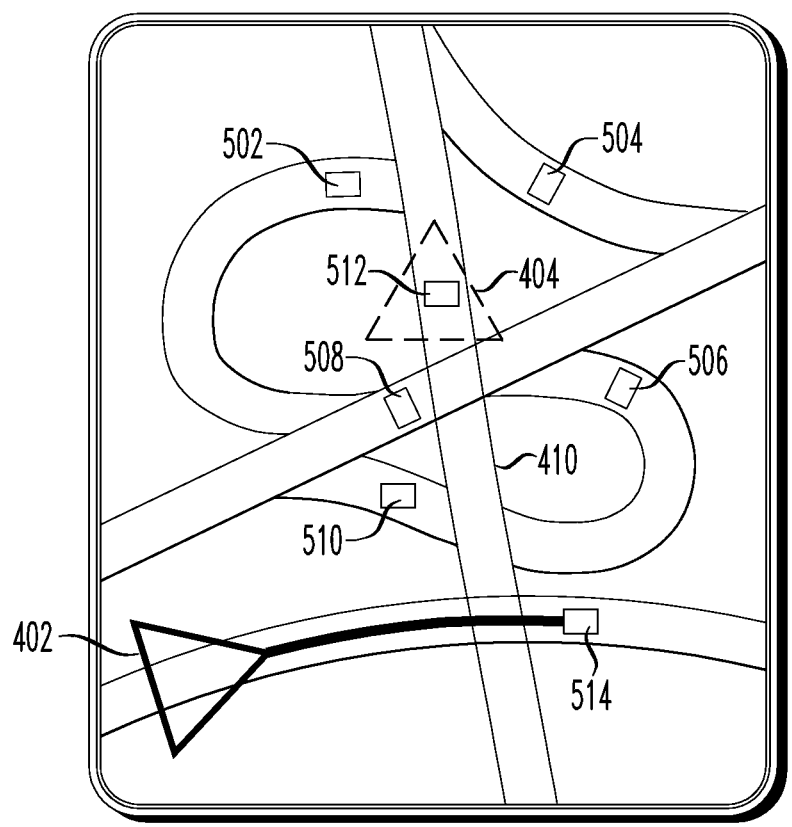

In particular, FIG. 4A depicts a route to get to location candidate 510 from the last known position 402. FIG. 4B depicts a route to get to location candidate 512 from the last known position 402. FIG. 4C depicts a route to get to location candidate 502 from the last known position 402. FIG. 4D depicts a route to get to location candidate 508 from the last known position 402. FIG. 4E depicts a route to get to location candidate 506 from the last known position 402. FIG. 4F depicts a route to get to location candidate 504 from the last known position 402. FIG. 4G depicts a route to get to location candidate 514 from the last know position 402.

For each candidate reverse geocode result, a route is generated between the last known location 402 and the respective candidate location 502-514. This route generation step calculates estimated elapsed time based on the speed limit of each road segment traveled. The present invention also contemplates that other influences such as traffic impacts may be taken into account, e.g., the presence and duty cycle of traffic lights along the way, stop signs, etc.

Referring back to FIG. 2, in step 310, for each route to respective candidate locations calculated in step 308, the travel time is determined, and compared to an elapsed time between the time stamp of the last known location 406 and the time stamp of the latest GPS fix 404.

The location candidates 502-514 are ranked based on the elapsed time between the two GPS fixes 402 and 404, and the estimated time of travel between the known and current location.

The travel time for each route is generally the driving distance on each road segment x the speed limit on each road segment. For simplicity purposes of the given embodiment shown in FIGS. 4A to 4G, it is presumed that the speed limit is the same on all shown roads.

In step 312, a best fit candidate location is selected as a candidate location having a time closest to an expected time since the last known location was fixed. Thus, the location candidate with the smallest time difference is selected and returned as the reverse geocode result. Given the presumption above about a same speed limit on all shown roads in this example, the candidate location shown in FIG. 4G is a best fit.

Referring back to FIG. 2, in step 314, a new route is calculated from the latest or current location fix 404, to the original destination.

Finally, in step 316, the new route is communicated to the client mobile phone 120.

The present invention may be generalized further to find a best-fit route between a series of 2 or more points, in accordance with the principles of the present invention. In this case, there is not a last known location but pairs of candidates from which the most likely route may be selected. This would be more computationally intensive but can be used to improve the accuracy of reverse geocoding (of a moving device) when there is no last known location.

The invention may also be generalized by maintaining an ongoing list of likely reverse geocode results. For each subsequent GPS fix, the previous list may be used to generate the new list. This may be employed even when not on a route.

The present invention has particular application to navigation application providers.

While the invention has been described with reference to the exemplary embodiments thereof, those skilled in the art will be able to make various modifications to the described embodiments of the invention without departing from the true spirit and scope of the invention.

What is claimed is:

1. A method of providing an accurate location to a wireless navigation device in a congested area, comprising:
   obtaining a latest location of a wireless navigation device;
   determining a plurality of potential actual location candidates on a navigation route within an error distance from said latest location;
   receiving a last known on-route location of said wireless navigation device;
   determining an estimated travel time between said last known on-route location and each of said plurality of candidate locations; and
   mapping as a most likely current location of said wireless navigation device a one of said plurality of potential actual location candidates having an estimated travel time that closest matches an elapsed time on said navigated route between said last known on-route location and said latest location.

2. The method of providing an accurate location to a wireless navigation device in a congested area according to claim 1, wherein:
   said latest location is determined by a global positioning satellite (GPS) system.

3. The method of providing an accurate location to a wireless navigation device in a congested area according to claim 1, further comprising:
   providing a new navigation route from said most likely current location to an original destination of said wireless navigation device on said navigation route.

4. The method of providing an accurate location to a wireless navigation device in a congested area according to claim 1, wherein:
   said latest location is off-route of said navigation route.

5. The method of providing an accurate location to a wireless navigation device in a congested area according to claim 1, wherein:
   said wireless navigation device is a wireless phone.

* * * * *